(12) United States Patent
Oohara et al.

(10) Patent No.: US 6,238,544 B1
(45) Date of Patent: May 29, 2001

(54) METHOD OF PURIFICATION OF SALT SOLUTIONS FOR ELECTROLYSIS

(75) Inventors: Chisako Oohara, Kurashiki; Terumi Matsuoka; Takamichi Kishi, both of Okayama; Takako Okuno, Fukuyama, all of (JP)

(73) Assignee: Chlorine Engineers Corp., Ltd. (JP)

( * ) Notice: Subject to any disclaimer, the term of this patent is extended or adjusted under 35 U.S.C. 154(b) by 0 days.

(21) Appl. No.: 09/374,505

(22) Filed: Aug. 16, 1999

(30) Foreign Application Priority Data

Aug. 28, 1998 (JP) .................................................. 10-259426
Jun. 14, 1999 (JP) .................................................. 11-167141

(51) Int. Cl.$^7$ ....................................................... C25B 1/34
(52) U.S. Cl. ........................................... 205/536; 205/770
(58) Field of Search ..................................... 205/770, 536

(56) References Cited

U.S. PATENT DOCUMENTS

| | | | |
|---|---|---|---|
| 4,483,754 | 11/1984 | Shiroki | 204/98 |
| 5,464,603 | 11/1995 | Marchin et al. | 423/501 |

FOREIGN PATENT DOCUMENTS

| | | |
|---|---|---|
| 427256 | 11/1990 | (EP) . |
| 699628 | 8/1995 | (EP) . |
| 350114 | 3/1991 | (JP) . |
| 688777 | 11/1994 | (JP) . |
| 7237919 | 9/1995 | (JP) . |
| 791666 | 10/1995 | (JP) . |

OTHER PUBLICATIONS

New Desulfation System for Chlor–alkali Plant Saiki et al, vol. 6, No. 82–88, No date available.

Patent Abstracts of Japan vol. 1996, No. 4, No month available.

Patent Abstracts of Japan vol. 1997, No. 7, No month available.

*Primary Examiner*—Kathryn Gorgos
*Assistant Examiner*—Christopher Keehan
(74) *Attorney, Agent, or Firm*—Lorusso & Loud

(57) ABSTRACT

In a method of removing impurities, especially iodine and/or silica ions, from a salt solution to be used for electrolysis, the salt solution and zirconium hydroxide are brought into contact with each other under acidic conditions, and the zirconium hydroxide adsorbs the impurities. Thereafter, the zirconium hydroxide containing the adsorbed impurities is brought into contact with an aqueous solution at a higher pH value to desorb the impurities from the zirconium hydroxide, thereby enabling the zirconium hydroxide to be recycled.

13 Claims, No Drawings

METHOD OF PURIFICATION OF SALT SOLUTIONS FOR ELECTROLYSIS

BACKGROUND OF THE INVENTION

1. Field of the Invention

The present invention relates to a method of purification of salt solutions to be subjected to electrolysis, and more particularly to a method of removing iodine and silica ions from the salt solutions, which ions adversely affect electrolysis, using zirconium hydroxide.

2. Description of the Related Art

It has been known that when a salt solution (brine) is subjected to electrolysis by using an ion exchange membrane method, iodine ions of around 1 ppm (weight) and silica ion of 10 to 20 ppm (weight) contained in the raw salt solution adversely affect electrolysis performance, and in order to overcome such a problem, various methods have been used to remove iodine and silica ions contained in the salt solutions to be electrolyzed. For example, an ion exchange method as disclosed in Japanese Laid-open Patent Application No. Hei-7-237919, an activated carbon adsorption method as disclosed in Japanese Post-examined Patent Application No. Hei-7-91666, a sedimentation method as disclosed in Japanese Post-examined Patent Application No. Hei-6-88777, etc. have been proposed as methods of removing iodine ions from the salt solutions.

For silica ion removal from salt solutions, there have been proposed the magnesium ion addition method disclosed in Japanese Post-examined patent application No. Sho-55-3290, etc., the primary refined sedimentary slurry circulation method disclosed in Japanese Post-examined patent application No. Sho-59-43556, etc. and the chelating resin adsorption method disclosed in Japanese Laid-open patent application No. Sho-60-125388, etc.

However, it has been found that the above conventional methods have the following disadvantages.

According to the ion exchange method as disclosed in Japanese Laid-open Patent Application No. Hei-7-237919, iodine ions are oxidized into iodine complex ions, and then the iodine complex ions thus obtained are removed through ion exchange using an anion exchange resin. However, it is difficult to surely control the oxidation of iodine ions to iodine complex ions. For example, iodate ions are also produced as one type of oxidized products obtained by oxidizing iodine ions. However, iodate ions cannot be adsorbed by the anion exchange resin. Therefore, when iodate ions are produced, some of iodine ions remain in the salt solution even when the salt solution is passed through the anion exchange resin. Accordingly, this method has a low efficiency in removal of iodine ions, and it is difficult to reduce the concentration of the iodine ions down to 0.2 mg/l or less, which is the maximum for the ion exchange membrane electrolysis process.

In the activated carbon adsorption method as disclosed in Japanese Post-examined Patent Application No. Hei-7-91666, it is difficult to surely control the oxidation of iodine ions to iodine complex ions. In addition, the iodine complex ions thus produced are reduced into iodide ions by activated carbon, and the adsorption efficiently is thereby reduced.

According to the sedimentation method as disclosed in Japanese Post-examined Patent Application No. Hei-6-88777, iodine ions are oxidized into periodate ions to form and deposit periodate which is only sparingly soluble, thereby removing the iodine ions. However, this method has also a low removal efficiency for iodine ions.

Among the above references disclosing silica ion removal, the magnesium ion addition method disclosed in Japanese Post-examined patent application No. Sho-55-3290 involves silica ion adsorption by magnesium hydroxide ion produced by adding magnesium chloride solution to the raw salt solution, but needs further improvement because of the high cost of disposal of the salt solution mud generated by the addition of magnesium hydroxide.

The primary refined sedimentary slurry circulation method disclosed in Japanese Post-examined patent application No. Sho-59-43556 forms silica salts from the silica ions by circulation of a portion of the primary refined sedimentary slurry of calcium carbonate or magnesium hydroxide, etc., settled in a sedimentation vessel. However, this method cannot reduce silica ion concentration to less than 2 ppm (weight) as $SiO_2$.

The chelating resin adsorption method disclosed in Japanese Laid-open patent application No. Sho-60-125388 treats salt solutions with a strong cationic micro-porous type chelating resin under a slightly acidic condition. But this method has a lower silica ion removal efficiency than the above two methods.

SUMMARY OF THE INVENTION

Accordingly, it is an object of the present invention to provide a method of removing iodine and silica ions from salt solutions which overcomes the disadvantages of the prior art noted above and which removes iodine and silica ions from the salt solution with high efficiency, and also which is stable, economical and industrially highly practical. It has now been found that iodine and silica ions are effectively adsorbed by zirconium hydroxide under certain conditions, and that the iodine and silica ions thus adsorbed are desorbed from the zirconium hydroxide under certain conditions.

The present invention provides a method of removing ions of impurities from salt solutions to be used for electrolysis, in which the salt solution containing the ions of impurities and zirconium hydroxide are contacted with each other under acidic conditions to adsorb and remove the impuritiy ions. The present invention is preferably applied to a salt solution containing iodine and/or silica ions as the impurities.

More specifically, according to the present invention, there is provided a method of removing iodine and/or silica ions from a salt solution for electrolysis including (1) an adsorbing step in which the salt solution containing iodine and/or silica ions is brought into contact with zirconium hydroxide under acidic conditions to adsorb and remove the iodine and/or silica ions, and (2) a desorbing step in which the zirconium hydroxide, containing the adsorbed iodine and/or silica ions, is brought into contact with an aqueous solution of a higher pH value than the pH value in the adsorbing step to desorb the adsorbed iodine and/or silica ions from the zirconium hydroxide, and (3) conducting the above adsorbing and desorbing steps alternately in a single vessel or both steps continuously in separate vessels.

In the above method of removing impurity ions, for example typically iodine and/or silica ions in salt solutions for electrolysis, it is preferable that the adsorbing step and the desorbing step are sequentially performed in different treatment vessels while zirconium hydroxide is circulated between these treatment vessels. The method of removing impurities from the salt solutions for electrolysis according to the present invention can be also applied for the treatment of salt solutions having neutral and/or colloidal silica through a pre-treatment wherein the neutral and/or colloidal silica is converted to silicic ion.

It has been known that non-dissociative neutral silica and colloidal silica, in addition to the above silicic acid ion, exist as soluble silica. The present invention is preferably applied to removal of the silicic acid ion. Where the salt solution contains a large amount of non-dissociative neutral silica, silica ion can be removed by means of conversion of the non-dissociative neutral silica or colloidal silica into the silicic acid ion through pretreatment of the salt solution to make it alkaline. Therefore, an alkaline processing step, used as a pre-treatment for the above method of removing impurity ions from the salt solutions for electrolysis is in the scope of the present invention.

Ionic impurities in salt solutions to be subjected to electrolysis which adversely affect the electrolytic processing include iodine, silica, sulfate, chlorate, calcium, magnesium, strontium, barium, aluminum, iron, nickel, etc. The present invention can be applied to the treatment of salt solutions containing all these impurities. However, since iodine and silica ions govern the detailed description of the present invention will refer to mainly removal of iodine and silica.

In the present invention, the term "iodine ion" includes iodide ion ($I^-$), iodine complex ion ($I^{3-}$), iodate ion ($IO^{3-}$), periodate ion ($IO^{4-}$, $IO_6^{5-}$), etc. and "silica ion" includes soluble and dissociated silicic acid ion ($SiO_3^{2-}$).

According to the present invention, salt solution containing iodine and silica ions in concentrations on the order of ppm are brought into contact with zirconium hydroxide having excellent adsorption affinity for iodine and silica ions under suitable conditions, so that iodine and silica ions in the salt solutions can be removed with high efficiency and stability.

Further, the iodine and/or silica ions adsorbed on the zirconium hydroxide can be desorbed from the zirconium hydroxide by a proper treatment, and thus the zirconium hydroxide can be recycled. Therefore, zirconium hydroxide can be repetitively used for the adsorption and desorption of iodine and/or silica ions, and thus iodine and/or silica ions in the salt solutions can be efficiently removed without increase in cost.

Still further, the adsorption and the desorption of iodine and/or silica ions can be alternately or sequentially repeated and thus iodine and/or silica ions contained in the salt solutions can be stably removed.

Zirconium hydroxide used as the adsorbent for iodine and/or silica ions can also adsorb iodate ions and periodate ions efficiently, and thus the method of the present invention can remove iodine ions more efficiently than the conventional methods.

DETAILED DESCRIPTION OF THE PREFERRED EMBODIMENTS

In advance of describing preferred embodiments of the present invention, the basic concept of the present invention will be described in detail.

In the present invention, iodine and/or silica ions in salt solutions are adsorbed by zirconium hydroxide to remove the iodine and/or silica ions from the salt solutions. The manner of use of zirconium hydroxide to adsorb iodine and/or silica ions is not specifically limited, and powder and granular forms of zirconium hydroxide may be used as is (hereinafter referred to as "zirconium hydroxide alone"). Alternatively, the zirconium hydroxide may be supported on ion exchange resin (hereinafter referred to as "zirconium-hydroxide ion exchange resin"). When zirconium hydroxide is used just as is, no restriction is imposed on its composition (the content of zirconium). However, when it contains a large amount of water, it may be unusable in repetitive manner because its mechanical strength is low. Accordingly, in order to enable repetitive use and recycle of the zirconium hydroxide for adsorption and desorption of iodine and/or silica ions, it is preferable that zirconium hydroxide contain water in the amount of 40 weight % or less. Here, "water" contained in the zirconium hydroxide means variation in weight when zirconium hydroxide containing water is ignited to be decomposed into zirconium dioxide.

Zirconium hydroxide supported on ion exchange resin is preferable because it is more easily handled. Any one of strongly acidic cation exchange resins, weakly-acidic cation exchange resins and chelating resins may be selectively used as the ion exchange resin for supporting zirconium hydroxide thereon. The anion exchange resins have a lower efficiency in supporting zirconium hydroxide and adsorb/desorb chloride ions, so that selectivity of adsorption of iodine and/or silica ions is lost. Therefore, use of anion exchange resin is unfavorable.

Further, any one of or both of the so-called gel type and micro-porous type resins, which are classified in accordance with the state of their surface, may be used for the ion exchange resin on which zirconium hydroxide is supported. Although the gel-type resin has a lower adsorption/desorption rate for iodine and/or silica ions than the macro-porous type resin because the surface area thereof is smaller, it can be used by selecting a suitable condition.

Further, it is preferable to use a granular type ion exchange resin having an average particle size of 100 to 1200 $\mu$m. If the average particle size is smaller than 100 $\mu$m, it is cumbersome to handle the resin. On the other hand, if the average particle size is larger than 1200 $\mu$m, the adsorption rate and the desorption rate of iodine and/or silica ions are reduced.

Zirconium hydroxide may be supported on the above ion exchange resins by the following method. Aqueous solution containing zirconyl ion and ion exchange resin are contacted to convert functional groups of the ion exchange resin to zirconyl type functional groups, and then further contacted with an aqueous solution containing hydroxide ions such as ammonia, caustic alkali metal, calcium hydroxide, tetraalkylammonium hydroxide or the like. In this case, the optimal alkali aqueous solution may be used in comprehensive consideration of safety, the effect on the environment when it is disposed, cost, conditions of use, etc. For example, ammonia has the advantage that only a small amount of ammonium ion reacts with zirconium hydroxide because it is weak base, and thus it can be easily removed from zirconium hydroxide. Therefore, ammonia would be preferable but for its price being higher than that of caustic soda and nitrogen, which is subject to waste water regulation, may get into waste water in a high concentration. On the other hand, caustic soda has the disadvantage that it contains sodium ion which reacts with zirconium hydroxide because it is a strong base, and thus it cannot be removed from zirconium hydroxide unless subjected to acidic conditions. However, it has the advantages that its price is lower than that of ammonia and it presents little problem in control of the waste water.

The amount of zirconium hydroxide supported on the ion exchange resin is suitably selected for the desired treatment capability, that is, the capability for absorption of iodine and/or silica ions in accordance with the treatment conditions such as the type of the ion exchange resin, the treatment capacity, the amount of the salt solution to be treated, etc. The supported amount of zirconium hydroxide can be adjusted by repetition of the step of making the zirconium hydroxide supported on the ion exchange resin. The number of times of the supporting step is not limited, and the optimal frequency is selected in accordance with the type of the ion exchange resin, the amount of zirconium hydroxide to be supported on the ion exchange resin (hereinafter referred to as "zirconium-hydroxide supporting ion exchange resin"), the concentration of zirconyl ion, etc. The capability of adsorbing iodine and/or silica ions (defined as a gram of iodine and/or silica ions adsorbed per ion exchange resin of one liter) has been found to be enhanced as the supported amount of zirconium hydroxide increases. As the iodine and/or silica ions adsorption capability is enhanced, the amount of ion exchange resin which is needed to treat a fixed amount of iodine and/or silica ions within a fixed time is reduced, and thus the capacity of the facilities for the treatment, etc. can be reduced. However, the increase of the amount of supported zirconium oxide causes increase in the amount of zirconium compounds and alkali which are needed for the supporting step, resulting in an increase in manufacturing cost. Accordingly, the amount to be supported must be determined on the basis of comprehensive considerations such as the manufacturing cost, the facility cost, etc. For example, when zirconium hydroxide is supported on strongly acidic cation exchange resin, in order to complete the treatment with only one supporting step, large-scale facilities and a large amount of resin are needed because the iodine and/or silica ion adsorption capability is low, and therefore, unfavorable. On the other hand, with three or more supporting steps, it is impossible to reduce the scale of the facilities and the cost of the resin. Accordingly, it is most preferable that the supporting step be executed twice.

It has been found that zirconium hydroxide gives excellent performance in removal of iodate ion and periodate ion when it is used just as is (i.e., it is used alone), and also gives excellent performance in removal of iodide ion, iodate ion and periodate ion when it is used supported on resin. Thus, the type of zirconium hydroxide adsorbent can be suitably selected in accordance with the form of iodine ions contained in the salt solution to be treated.

For example, iodine ions contained in so-called well brine used in U.S.A., etc., mainly exist as iodide ions. In this case, zirconium-ion- supported ion exchange resin may be used. Alternatively, these ions may be oxidized into iodate ion by chlorine, hypochlorite, bromine or the like, whereby either zirconium hydroxide alone or zirconium-hydroxide-supporting ion exchange resin can be used.

Further, in the so-called fresh salt solutions from anion exchange membrane electrolytic tanks, iodine ions exist mainly as iodate ion or periodate ion, and zirconium hydroxide alone or zirconium-hydroxide supported on ion exchange resin may be selectively used. As described above, the method of removing iodine ions from the salt solutions according to the present invention is particularly effective to remove iodine ions in the form of iodide ion, iodate ion and periodate ion, and is suitably applied to the solutions containing these ions.

As noted above, different forms of soluble silica may be contained in the salt solutions to be treated. For example, almost all of silica in the salt solution made from bay salt exists as soluble silica ion, but silica in the aforementioned well brine often coexists as non-dissociative neutral silica or colloidal silica, in addition to silicic silica. In the treating of the salt solutions containing such non-dissociative neutral silica or colloidal silica, since zirconium hydroxide selectively adsorbs silicic ion as described above, silica components may be silica such as neutral silica, etc., into silicic ion by alkaline pre-processing.

In case of a salt solution containing both iodine and silica ions, the type of zirconium hydroxide to be used should be selected depending upon the form of iodine ions, because either zirconium hydroxide alone or zirconium hydroxide supported on ion exchange resin can be used to remove silica ion. Furthermore, in case of well brine, iodide components may be removed through oxidation after removal of high content silica by alkaline pre-processing.

In the present invention, a iodine and/or silica ions containing salt solution and zirconium hydroxide alone or zirconium-hydroxide supported on ion exchange resin are brought into contact with each other to remove iodine and/or silica ions from the salt solutions, and no restriction is imposed on the method of contact. For example, there may be used any well-known contact method such as supplying the salt solution to be treated to the zirconium hydroxide alone or zirconium-hydroxide supported on exchange resin through downflow or upflow while the zirconium hydroxide or supported zirconium-hydroxide ion exchange resin is maintained as a fixed-layer. In another conventional method zirconium hydroxide alone or supported zirconium-hydroxide and the salt solution are mixed in a tank equipped with a stirring mechanism to form a slurry. Another method supplies the salt solution from a lower portion of a packed tower filled with zirconium-hydroxide supported on ion exchange resin to form a fluidized bed.

In the iodine and/or silica ion adsorption step, the contact between iodine and/or silica ions contained in the salt solutions and zirconium hydroxide is performed under acidic conditions. In this case, the acidity is pH 1 to 5, preferably pH 2 to 3. If the pH value is lower than 1, zirconium hydroxide is partially dissolved, or sodium chlorate coexisting in the salt solution is decomposed to generate chloride components. Therefore, safety is unfavorably compromised. On the other hand, if the pH value is higher than 5, the removal rate of iodine and/or silica ions is unfavorably reduced.

The acidity at the above pH value can be kept by adding acid such as hydrochloric acid, nitric acid or the like. Usually, the salt solution to be treated contains alkali metal chlorides, and thus hydrochloric acid is used. The contact temperature is set to the range from 0° C. to 100° C., and preferably to the range from 40° C. to 90° C. As the contact temperature is increased, the adsorption rate is increased, and rate of the purification of salt solution is enhanced. Further, no restriction is imposed on the concentration of salt in the salt solution to be treated when iodine and/or silica ions are removed through adsorption, and thus general salt solutions having salt concentrations of 15 to 26 weight % can be treated. It has now been discovered that the affinity between zirconium hydroxide and iodine and/or silica ions is large, and the adsorption can be performed irrespective of the concentration of the salt solutions. Accordingly, in the present invention, it is unnecessary to dilute or condense the salt solution to be treated, with the advantage that the operation is simplified.

In the present invention, after zirconium hydroxide or zirconium-hydroxide supported on ion exchange resin, serving as adsorbent, is brought into contact with iodine and/or silica ions contained in salt solution to adsorb iodine and/or silica ions, the adsorbent may be disposed, or re-used after the adsorbed iodine and/or silica ions are desorbed. When the adsorbent is disposed after only one adsorption step, the desorbing step is unnecessary, and this process has an industrial merit from the viewpoint of the tradeoff between the cost of the adsorbent and the difficulties of disposal. Normally, iodine and/or silica ions are desorbed from the zirconium hydroxide or supported zirconium-hydroxide which is then recycled for reuse.

In the iodine and/or silica ion desorbing step, zirconium hydroxide or supported zirconium hydroxide with adsorbed iodine ion is brought into contact with an aqueous solution at a pH value higher than the pH value in the adsorption step to desorb iodine and/or silica ions from it for recycle. The pH value in the adsorption step is set to 7 to 14, and preferably to 9 to 13. In order to set the pH value to the above value, an alkaline agent such as caustic soda or the like is added. If the pH value is lower than 7, the desorption efficiency is low. On the other hand, if the pH value is higher than 14, a large amount of alkali is needed, and this is economically unfavorable.

No restriction is imposed on the method of bringing zirconium hydroxide or supported zirconium hydroxide into contact with the aqueous solution of a predetermined pH value in the desorption step. As in case of the adsorption step, there may be suitably selected a conventional contact method using a fixed layer, a slurry, a fluidized bed or the like. Further, the desorption temperature is set to 0° C. to 100° C., preferably to 20° C. to 70° C. As the desorption temperature is increased, the desorption rate is increased and the separability of aqueous solution is also favorably enhanced. However, when the temperature is excessively high, the thermal energy of steam or the like is needed to heat the aqueous solution.

In the present invention, before the above-described desorption treatment, the adsorbent such as zirconium hydroxide or the like after the adsorption of iodine and/or silica ions is subjected to a water washing treatment as occasion demands. Through the water-washing treatment after the adsorption, the amount of salt discharged to the outside of the system can be reduced. Further, the adsorbent such as zirconium hydroxide after the desorption is subjected to a water-washing treatment as occasion demands. The water-washing treatment after the desorption can reduce the amount of iodine and/or silica ions which are fed to the adsorption step together with the recycled adsorbent such as zirconium hydroxide or the like to be reused.

The iodine-ion adsorption and desorption steps may be alternately and repetitively performed in a predetermined manner in a single treatment tank. Alternatively, plural treatment tanks may be used to sequentially perform the adsorption and desorption steps in each treatment tank. Further, the adsorption and the desorption may be sequentially performed in different treatment tanks, and the adsorption/desorption steps may be sequentially performed while adsorbent such as zirconium hydroxide or the like is circulated between the different treatment tanks. By sequentially performing the adsorption step and the desorption step as described above, iodine and/or silica ions can be removed from salt solution efficiently, stably and economically.

PREFERRED EMBODIMENTS

Preferred embodiments according to the present invention will be described in detail, however, the present invention is not limited to the following embodiments.

Zirconium hydroxide alone containing 17.5 weight % water and having an average particle size of 7.3 $\mu$m was used as the adsorbent in the following embodiments. The zirconium hydroxide supported on ion exchange resin was prepared by the following method. That is, 10 liters of cation exchange resin produced by Mitsubishi Chemical Corporation (Trade name: Diaion PK216, average particle size of 740 $\mu$m) was poured into a polypropylene container, and then 20 liter of 2M(mole) zirconium oxychloride aqueous solution was added. The cation exchange resin was immersed in the above aqueous solution for 2 hours while suitably stirred. Then the zirconium oxychloride aqueous solution was removed by decantation, and washed five times with 25 liters of pure water. The resin was poured into 40 liters of a 2M caustic soda solution and immersed for 1 hour while stirring the solution. The caustic soda solution was removed by decantation, and a water wash was performed five times with 25 liters of pure water. The wash water in the fifth step was not wasted, and concentrated hydrochloric acid was added drop-wise until the pH value of the system became 2.5. The solution was discarded by decantation, and after the 20 liters of 2M zirconium oxychloride solution was added, the same operation as described above was repeated with addition of hydrochloric acid until the pH value of the system became 2.5, and finally a zirconium hydroxide supported on cation exchange resin was obtained by performing the supporting step twice. The amount of zirconium hydroxide supported on the ion exchange resin became about 9 mole.

EXAMPLES 1 to 6

A solution containing a mixture of NaCl of 300 g/l, $Na_2SO_4$ of 3 g/l and $NaIO_3$ of 1.6 mg/l was prepared and 100 ml of same was poured into each of six conical flasks and immersed in an isothermal tank to adjust the temperature of the solution to 50±1° C., and then the zirconium hydroxide alone in amounts of of 10 g (Example 1), 5 g (Example 2), 2 g (Example 3), 1 g (Example 4), 0.5 g (Example 5) and 0.1 g (Example 6) was added into each flask. Further, hydrochloric acid was added dropwise into the solution in each flask while stirring the solution, and the contact treatment was conducted for 15 minutes while keeping the pH value of the solution at 3. Supernatant liquor after the treatment was filtered and collected, and then iodine components were analyzed by absorptiometry to measure the extent of iodine removal. The results are shown in the following table 1. From Examples 1 to 6, it is clear that iodate ions can be effectively removed by contacting zirconium hydroxide alone with iodate ions contained in salt solution.

TABLE 1

| Example | Amount of Zirconium Hydroxide Added (g) | Iodine (Iodate ion) Removal (%) |
| --- | --- | --- |
| 1 | 10 | 99 |
| 2 | 5 | 99 |
| 3 | 2 | 99 |
| 4 | 1 | 98 |
| 5 | 0.5 | 96 |
| 6 | 0.1 | 71 |

EXAMPLES 7 to 9

A solution containing a mixture of NaCl of 300 g/l, $Na_2SO_4$ of 3 g/l and $NaIO_4$ of 1.7 mg/l was prepared. 100 ml of the solution thus prepared was poured into each of three conical flasks and immersed in an isothermal tank to adjust the temperature of the solution to 50±1° C., and then the zirconium hydroxide alone in the amounts of 10 g (Example 7), 5 g (Example 8) and 1 g (Example 9) was added into each flask. Further, hydrochloric acid was added dropwise into the solution in each flask while stirring the solution, and the contact treatment was conducted for 15 minutes while keeping the pH value of the solution at 3. Supernatant liquor after the treatment was filtered and collected, and then iodine components were analyzed in the same manner as Example 1 to measure the extent of iodine removal. The results are shown in the following table 2. From Examples 7 to 9, it is clear that periodate ion can be effectively removed by contacting zirconium hydroxide alone with periodate-ion contained in salt solutions.

TABLE 2

| Example | Amount of Zirconium Hydroxide Added (g) | Iodine (Iodate ion) Removal (%) |
| --- | --- | --- |
| 7 | 10 | 100 |
| 8 | 5 | 100 |
| 9 | 1 | 97 |

EXAMPLES 10 to 15

100 ml of the same solution as used in Example 1 was poured into each of six conical flasks, and immersed in an isothermal tank to adjust the temperature of the solution to 50±1° C. Thereafter, the zirconium-hydroxide supported on cation exchange resin (referred to as "supporting resin") in the amounts of 30 g (Example 10), 20 g (Example 11), 15 g (Example 12), 10 g (Example 13), 5 g (Example 14), 1 g (Example 15) which was prepared as described above was added to each flask. Further, hydrochloric acid was added dropwise into the solution in each flask while stirring the solution, and the contact treatment was conducted for 20 minutes while keeping the pH value of the solution at 3. Supernatant liquor after the treatment was filtered and collected, and then iodine components were analyzed in the same manner as Example 1 to measure the extent of iodine removal. The results are shown in the following table 3. From Examples 10 to 15, it is clear that iodate ion can be effectively removed by contacting zirconium hydroxide supported on ion exchange resin with an iodate ion contained in salt solution.

TABLE 3

| Example | Amount of Zirconium Hydroxide Added (g) | Iodine (Iodate ion) Removal (%) |
| --- | --- | --- |
| 10 | 30 | 98 |
| 11 | 20 | 95 |
| 12 | 15 | 90 |
| 13 | 10 | 88 |
| 14 | 5 | 85 |
| 15 | 1 | 32 |

EXAMPLES 16 to 18

100 ml of the same solution as used in Example 7 was poured into each of three conical flasks, and immersed in an isothermal tank to adjust the temperature of the solution to 50±1° C. Thereafter, the zirconium hydroxide supported on cation exchange resin ("supporting resin") in amounts of 10 g (Example 16), 5 g (Example 17), 1 g (Example 18) which was prepared as described above was added to each flask. Further, hydrochloric acid was added dropwise into the solution in each flask while stirring the solution, and the contact treatment was conducted for 20 minutes while keeping the pH value of the solution at 3. Supernatant liquor after the treatment was filtered and collected, and then iodine components were analyzed in the same manner as Example 1 to measure the percentage of iodine removal. The results are shown in the following table 4. From Examples 16 to 18, it is clear that periodate ion can be effectively removed by contacting zirconium hydroxide supported ion exchange resin with periodate-ion contained in salt solution.

TABLE 4

| Example | Amount of Zirconium Hydroxide Added (g) | Iodine (Iodate ion) Removal (%) |
| --- | --- | --- |
| 16 | 10 | 99 |
| 17 | 5 | 97 |
| 18 | 1 | 76 |

EXAMPLES 19 to 22

A solution containing a mixture of NaCl of 300 g/l, $Na_2SO_4$ of 3 g/l and NaI of 1.2 mg/l was prepared. 100 ml of the solution thus prepared was poured into each of four conical flasks and immersed in an isothermal tank to adjust the temperature of the solution to 50±1° C., and then the zirconium hydroxide supported on cation exchange resin (hereinafter referred to as "supporting resin") in amounts of 50 g (Example 19), 30 g (Example 20) and 20 g (Example 21) and 10 g (Example 22) was added into each flask. Further, hydrochloric acid was added dropwise into the solution in each flask while stirring the solution, and the contact treatment was conducted for 15 minutes while keeping the pH value of the solution at 3. Supernatant liquor after the treatment was filtered and collected, and then iodine components were analyzed in the same manner as Example 1 to measure the extent of iodine removal. The results are shown in the following table 5. From Examples 19 to 22, it is clear that iodine ions can be effectively removed by contact of zirconium hydroxide supported on ion exchange resin with an iodine ion contained in salt solution.

TABLE 5

| Example | Amount of Zirconium Hydroxide Added (g) | Iodine (Iodate ion) Removal (%) |
| --- | --- | --- |
| 19 | 50 | 77 |
| 20 | 30 | 48 |
| 21 | 20 | 32 |
| 22 | 10 | 20 |

EXAMPLE 23

A solution containing NaCl of 220 g/l, $Na_2SO_4$ of 7 g/l and $NaIO_3$ of 0.5 mg/l was prepared. 300 ml of the solution thus prepared was immersed in an isothermal tank to adjust the temperature of the solution to 50±1° C., and zirconium oxychloride (30 weight % solution) of 30 millimole was added. Thereafter, caustic soda (30 weight %) was added dropwise to adjust the pH value of the solution to 9 and to generate zirconium hydroxide in a slurry form. Thereafter, hydrochloric acid was added dropwise to adjust the pH value of the slurry to 3, and the reaction was conducted while keeping the pH value. Supernatant liquor after the reaction was filtered, and then iodine components were analyzed in the same manner as Example 1 to measure the extent of iodine removal. As a result, it was found that 98% of the iodine components was removed. Accordingly, it is clear that the iodate ion can be removed by contact between the iodate-ion contained in salt solution and the slurried zirconium hydroxide.

EXAMPLES 24 to 28

A solution containing NaCl of 300 g/l, $Na_2SO_4$ of 3 g/l and $NaSiO_3$ of 20.3 mg/l was prepared. 100 ml of the solution thus prepared was poured into each of five conical flasks and immersed in an isothermal tank to adjust the temperature of the solution to 50±1° C., and then the zirconium hydroxide alone in amounts of 10 g (Example 24), 5 g (Example 25), 2 g (Example 26), 1 g (Example 27) and 0.5 g (Example 28) was added into each flask. Further, hydrochloric acid was added dropwise into the solution in each flask while stirring the solution, and the contact treatment was conducted for 15 minutes while keeping the pH value of the solution at 3. Supernatant liquor after the treatment was filtered and collected, and then silica components were analyzed by using the IPC emission spectral analysis to measure the extent of silica removal. The results are shown in the following table 6. From Examples 24 to 28, it is clear that silica ion can be effectively removed by contact of zirconium hydroxide alone with silica ion contained in salt solution.

TABLE 6

| Example | Amount of Zirconium Hydroxide Added (g) | Iodine (Iodate ion) Removal (%) |
| --- | --- | --- |
| 24 | 10 | 96 |
| 25 | 5 | 92 |
| 26 | 2 | 82 |
| 27 | 1 | 76 |
| 28 | 0.5 | 52 |

EXAMPLES 29 to 33

A mixture containing NaCl of 300 g/l, $Na_2SO_4$ of 3 g/l and $Na_2SiO_3$ of 20.3 mg/l was prepared. 100 ml of the solution thus prepared was poured into each of five conical flasks and immersed in an isothermal tank to adjust the temperature of the solution to 50±1° C., and then the supported zirconium hydroxide in amounts of 30 g (Example 25), 20 g (Example 26), 15 g (Example 27), 10 g (Example 28) and 5 g (Example 29) was added into each flask. Further, in the same manner as Example 10, hydrochloric acid was added dropwise into the solution in each flask while stirring the solution, and the contact treatment was conducted for 20 minutes while keeping the pH value of the solution at 3. Supernatant liquor after the treatment was filtered and collected, and then silica components were analyzed in the same manner as Example 24 to measure the extent of silica removal. The results are shown in the following table 7. From Examples 29 to 33, it is clear that the silica removal is enhanced as the amount of zirconium hydroxide supporting resin increases.

TABLE 7

| Example | Amount of Zirconium Hydroxide Added (g) | Iodine (Iodate ion) Removal (%) |
| --- | --- | --- |
| 29 | 30 | 92 |
| 30 | 20 | 85 |
| 31 | 15 | 80 |
| 32 | 10 | 65 |
| 33 | 5 | 25 |

EXAMPLES 34 to 38

A solution containing NaCl of 200 g/l, $Na_2SO_4$ of 5 g/l and $Na_2SiO_3$ of 12.2 mg/l was prepared and 100 ml of the solution thus prepared was poured into each of five conical flasks and immersed in an isothermal tank to adjust the temperature of the solution to 50±1° C., and then the zirconium hydroxide alone in amounts of 10 g (Example 34), 5 g (Example 35), 2 g (Example 36), 1 g (Example 37) and 0.5 g (Example 38) was added into each flask. Further, hydrochloric acid was added dropwise into the solution in each flask while stirring the solution, and the contact treatment was conducted for 15 minutes while keeping the pH value of the solution at 3. Supernatant liquor after the treatment was filtered and collected, and then silica components were analyzed by using the same method as Example 24 to measure the extent of silica removal. The results are shown in the following table 8. From Examples 34 to 38, it is clear that silica ion can be effectively removed by contact of zirconium hydroxide alone with silica ion contained in salt solution.

TABLE 8

| Example | Amount of Zirconium Hydroxide Added (g) | Iodine (Iodate ion) Removal (%) |
| --- | --- | --- |
| 34 | 10 | 98 |
| 35 | 5 | 95 |
| 36 | 2 | 88 |
| 37 | 1 | 78 |
| 38 | 0.5 | 54 |

EXAMPLES 39 to 43

A solution containing NaCl of 300 g/l, $Na_2SO_4$ of 8 g/l, $NaIO_3$ of 1.6 mg/l and $Na_2SiO_3$ of 20.3 mg/l was prepared and 100 ml of the solution thus prepared was poured into each of five conical flasks and immersed in an isothermal tank to adjust the temperature of the solution to 50±1° C., and then the zirconium hydroxide supported on ion exchange resin, in amounts of 30 g (Example 39), 20 g (Example 40), 15 g (Example 41), 10 g (Example 42) and 5 g (Example 43) was added into each flask. Further, hydrochloric acid was added dropwise into the solution in each flask while stirring the solution, and the contact treatment was conducted for 20 minutes while keeping the pH value of the solution at 3. Supernatant liquor after the treatment was filtered and collected, and then iodine components were analyzed by using the same method as Example 1 to measure the extent of iodine removal. And silica components were analyzed by using the same method as Example 24 to measure the extent of silica removal. The results are shown in the following table 9. From Examples 39 to 43, it is clear that removal of iodate and silica ions is enhanced as the amount of zirconium hydroxide supported on ion exchange resin is increased.

TABLE 9

| Example | Amount of Zirconium Hydroxide Added (g) | Iodine (Iodate ion) Removal (%) |
| --- | --- | --- |
| 39 | 30 | 92 |
| 40 | 20 | 85 |
| 41 | 15 | 80 |
| 42 | 10 | 65 |
| 43 | 5 | 25 |

EXAMPLE 44

A solution containing NaCl of 300 g/l, $Na_2SO_4$ of 7 g/l and $Na_2SiO_3$ of 20.3 mg/l was prepared and 300 ml of the solution thus prepared was immersed in an isothermal tank to adjust the temperature of the solution to 50±1° C., and zirconium oxychloride (30 weight % solution) in the amount of 30 milli-mole was added. Thereafter, caustic soda (30 weight %) was added dropwise to adjust the pH value of the solution to 9 and to generate zirconium hydroxide in a slurry form. Thereafter, hydrochloric acid was added dropwise to adjust the pH value of the slurry to 3, and the reaction was conducted 15 minutes while keeping the pH value. Supernatant liquor after the reaction was filtered, and then silica components were analyzed in the same manner as Example 24 to measure the extent of silica removal. As a result, it was found that 95% of the silica components was removed. Accordingly, it is clear that the silica ion can be removed by contacting the silica ion contained in salt solution and the slurried zirconium hydroxide.

EXAMPLE 45

A commercial colloidal silica solution of concentration of 30 weight % (manufacturer: NIHONKAGAKU), was mixed with a salt solution containing 300 g/l NaCl, 3 g/l $Na_2SO_4$, 10 mg/l silicic ion as $SiO_2$ (analyzed by absorptiometry using ammonium molybdate) and colloidal silica of 5 mg/l as $SiO_2$ (measured as a difference between total silica value analyzed by IPC emission spectrophotometry and silica acid value analyzed by ammonium molybdate absorptiometry) was prepared. After dissolving 2 g of sodium bicarbonate ($NaHCO_2$) in one liter, the thus prepared salt solution was immersed in a boiling bath for 60 minutes and then left to cool down to ambient temperature. After that the pH value of the salt solution was adjusted to 5 by adding hydrochloric acid. When analyzing the silica components in the thus treated salt solution by ammonium molybdate absorptiometry, it was found that all the silica components were converted to silicic ion.

100 ml of the solution thus prepared was poured into a conical flask and immersed in an isothermal tank to adjust the temperature of the solution to 50±1° C., and then 15 g of zirconium hydroxide alone was added into the flask. Further, hydrochloric acid was added dropwise into the solution in flask while stirring the solution, and the contact treatment was conducted for 20 minutes while keeping the pH value of the solution at 3. Supernatant liquor after the treatment was filtered and collected, and then silica components were analyzed by using the same method as Example 24 to measure the extent of silica removal. The silica removal was found to be 95%. Through this Example 45, it is confirmed that the silica components can be removed through contacting the salt solution, after pre-alkali treatment, with zirconium hydroxide in the case where colloidal silica is contained in the salt solution.

EXAMPLE 46

A solution containing NaCl of 300 g/l, $Na_2SO_4$ of 7 g/l and $NaIO_3$ of 1.6 mg/l was prepared to which hydrochloric acid was added dropwise to adjust the pH value of the solution to 3. Further, 50 g of zirconium hydroxide was dispersed in 500 ml of a salt solution (NaCl concentration of 100 g/l), and then filtered under reduced pressure to form a zirconium hydroxide cake layer to which mother liquor of the salt solution was adhered. The solution of pH 3 was then passed at a flow rate of 200 ml/hour through the cake layer for 300 hours while keeping the temperature of the solution at 50±1° C., to remove iodine from the solution by adsorption. Thereafter, alkali water of pH 13 was supplied at a flow rate of 200 ml/hour and passed through the cake layer for 50 hours while keeping the temperature at 50° C., to subject the cake layer to an alkali washing treatment, thereby removing iodine from the cake layer by desorption. Further, water at pH 2 was supplied at a flow rate of 500 ml/hour and passed through the alkali-washed cake layer for 100 hours while keeping the temperature of the water at 50° C., to regenerate the zirconium hydroxide. The adsorption step removing iodine from solution, the desorption step of desorbing iodine from the cake layer and the regeneration step are operated as one cycle, and the cycle was repeated four times. The iodine removal from the salt solution that was treated through all the cycles was equal to 95% or more. It is clear from this result that when zirconium hydroxide is used as adsorbent for iodine ions, the adsorption capability of zirconium hydroxide can be regenerated and it may be repetitively used by subjecting the zirconium hydroxide to alkali treatment to desorb the adsorbed iodine ions after the iodine ions are adsorbed by the zirconium hydroxide.

EXAMPLE 47

A solution containing NaCl of 300 g/l, $Na_2SO_4$ of 7 g/l and $NaSiO_3$ of 30.3 mg/l was prepared to which hydrochloric acid was added dropwise to adjust the pH value of the solution to 3. Further, 50 g of zirconium hydroxide was dispersed into salt solution (NaCl concentration of 100 g/l) of 500 ml, and then filtered under reduced pressure to form a zirconium hydroxide cake layer to which mother liquor of the salt solution was adhered. The silica-containing solution was passed at a flow rate of 200 ml/hour through the cake layer for 300 hours while keeping the temperature of the solution at 50° C. to remove silica from the solution by adsorption. Thereafter, zirconium hydroxide was regenerated through the same procedure as Example 46. By using the cake layer of the regenerated zirconium hydroxide, the silica contents contained in the salt solutions were removed again in the same manner as Example 46 by passing the solution through the cake layer. The adsorption step removing silica from the solution, the desorption step of desorbing silica adsorbed by the cake layer and the regeneration step are operated as one cycle, and the cycle was repeated four times. The silica removal from the salt solution that was treated through all the cycles was equal to 90% or more. It is clear from this result that when zirconium hydroxide is used as adsorbent for silica ion, the adsorption capability of zirconium hydroxide can be regenerated and can be repetitively used by subjecting zirconium hydroxide to alkali treatment to desorb the adsorbed silica ion after the silica ion is adsorbed by the zirconium hydroxide.

According to the method of purification of salt solutions for electrolysis in the present invention, zirconium hydroxide is used as adsorbent to remove iodine and/or silica ions which are contained in concentrations on the order of ppm in the salt solution and which adversely affect electrolysis. The method of the present invention also more selectively and more highly efficiently removes iodine and/or silica ions as compared with the conventional methods. Further, the method of the present invention is applicable irrespective of the type of salt solution and the concentration of salt. In addition, adsorbed iodine and/or silica ions are desorbed to recycle adsorbent, and thus the adsorbent can be repetitively used. Therefore, the method of the present invention is excellent in economy and industrial practical use. Further, the method of the present invention can remove iodine and/or silica ions from salt solutions so that the concentration of iodine ions is reduced to 0.2 ppm or less and concentration of silica ion to 5 ppm or less, if needed, i.e., to levels which do not adversely affect electrolysis of the salt solution by an ion exchange membrane method.

What is claimed is:

1. A method of purifying of a salt solution to be used for electrolysis by removal of iodine and/or silica ions from the salt solution, which method comprises contacting the salt solutions containing the iodine and/or silica ions, under acidic conditions, with zirconium hydroxide.

2. A method of purifying of a salt solution to be used according to claim 1, wherein said zirconium hydroxide is supported on a cation exchange resin.

3. A method of purifying of a salt solution to be used for electrolysis by removing impurities, which comprises:

(1) contacting, in an adsorption step, the salt solution with zirconium hydroxide at an acidic pH to remove iodine and/or silica ions from the salt solution through adsorption;

(2) contacting, in a desorption step, zirconium hydroxide containing adsorbed iodine and/or silica ions with an aqueous solution at a pH higher than said acidic pH to desorb the adsorbed iodine and/or silica ions from the zirconium hydroxide; and (3) conducting said adsorption and desorption steps alternately in a single vessel or continuously in separate vessels.

4. A method of purifying of a salt solution according to claim 3, wherein said adsorption step and said desorption step are sequentially performed in different treatment vessels, and zirconium hydroxide is circulated between said different treatment vessels.

5. A method of purifying of a salt solution according to claim 3, which further comprises:

a pre-treatment step of converting neutral and/or colloidal silica contained in the salt solution into silicic ions.

6. A method of purifying of a salt solution according to claim 5, wherein said pre-treatment is an alkali treatment.

7. A method of purifying a salt solution according to claim 3, wherein said zirconium hydroxide is supported on a cation exchange resin.

8. A method of purifying of salt solutions for electrolysis according to claim 1, wherein said zirconium hydroxide is supported on a cation exchange resin.

9. A method of purifying of salt solutions for electrolysis according to claim 4, wherein said impurities are iodine and/or silica ions.

10. A method of purifying of salt solutions for electrolysis according to claim 4, wherein said zirconium hydroxide is supported on a cation exchange resin.

11. A method of purifying of salt solutions for electrolysis according to claim 5, wherein said zirconium hydroxide is supported on a cation exchange resin.

12. A method for purifying a salt solution according to claim 1 further comprising, prior to said contacting:

treating the salt solution with an oxidizing agent to oxidize iodide ions contained in said salt solution thereby converting said iodide ions into iodate ions.

13. A method of purifying a salt solution according to claim 12 wherein said iodide ions are oxidized by treating said salt solution with an oxidizing agent selected from the group consisting of chlorine, bromine, and hypochlorite salts.

* * * * *